Feb. 24, 1925.
W. FERRELL
TRAP
Filed April 10, 1923   2 Sheets-Sheet 1
1,527,854
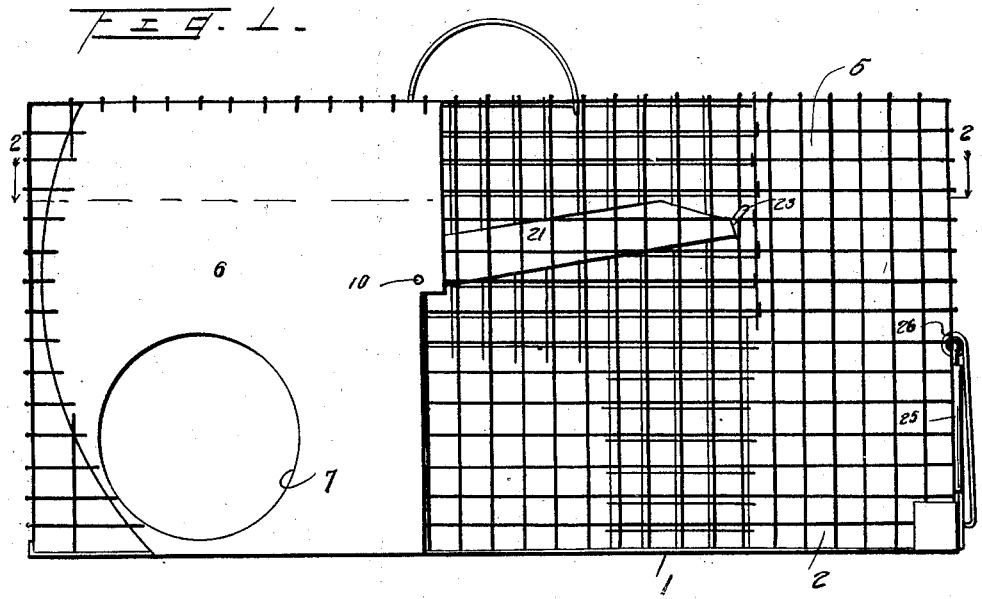
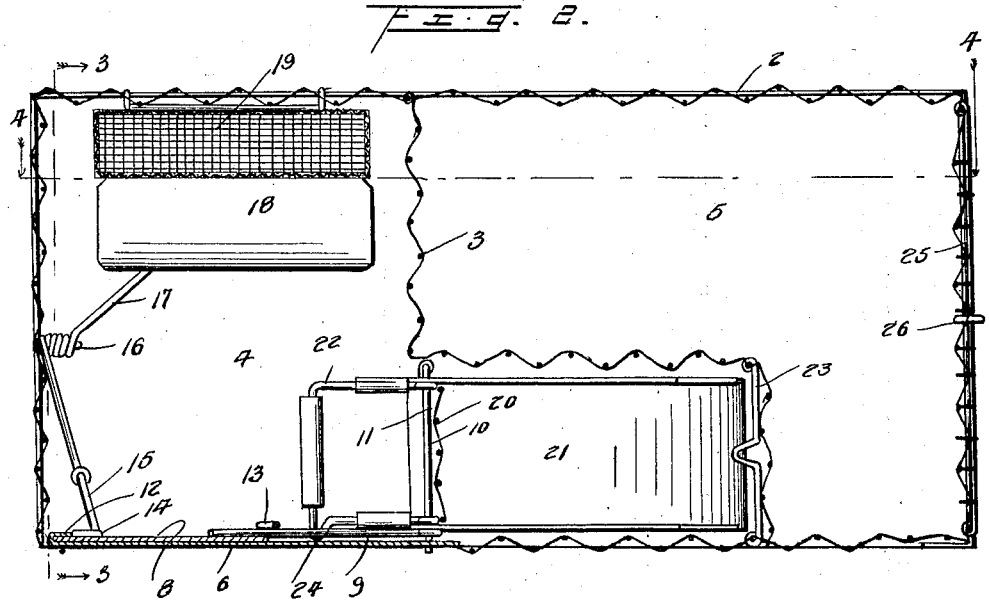
Inventor
W. Ferrell.

Feb. 24, 1925.
W. FERRELL
TRAP
Filed April 10, 1923
1,527,854
2 Sheets-Sheet 2
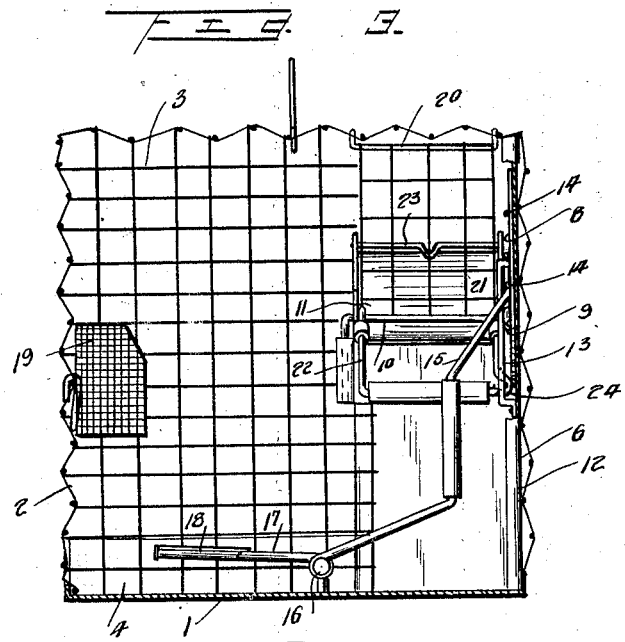
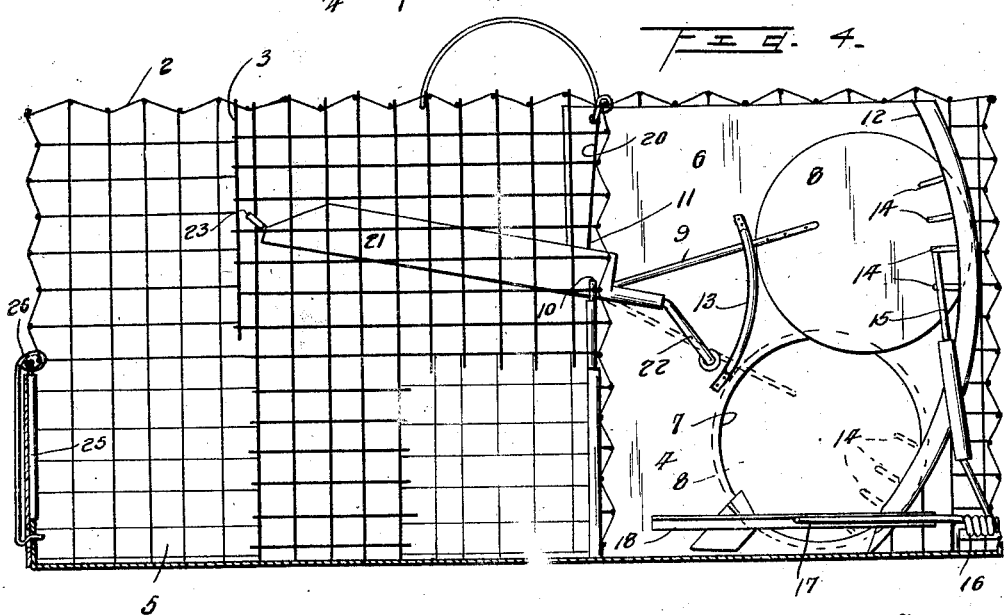
Inventor
W. Ferrell,
By
Attorney Patented Feb. 24, 1925.

1,527,854

UNITED STATES PATENT OFFICE.

WILLIAM FERRELL, OF BRIDGEPORT, OHIO.

TRAP.

Application filed April 10, 1923. Serial No. 631,154.

*To all whom it may concern:*

Be it known that I, WILLIAM FERRELL, a citizen of the United States, residing at Bridgeport, in the county of Belmont and State of Ohio, have invented certain new and useful Improvements in Traps; and I do hereby declare the following to be a full, clear, and exact description of the invention, such as will enable others skilled in the art to which it appertains to make and use the same.

The invention relates to the type of trap specially designed for catching rats and which is automatically set by the animal when passing from one compartment of the trap to another compartment.

The invention is designed to produce a trap which is effective and which may be economically constructed so as to be supplied at a relatively small cost and which may be readily cleaned and utilized to dispose of the rats by drowning.

Other objects and advantages will be apparent and suggest themselves as the nature of the invention is disclosed.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a trap embodying the invention,

Figure 2 is a top plan view thereof,

Figure 3 is a transverse section on the line 3—3 of Figure 2,

Figure 4 is a longitudinal section on the line 4—4 of Figure 2, looking in the direction of the arrows.

Corresponding and like parts are referred to in the following description and designated in the several views of the drawings by like reference characters.

The trap may be constructed of any suitable material and it is preferred to form the bottom 1 of sheet metal, such as galvanized iron, and the body and partitions of wire fabric of a mesh to prevent escape of the entrapped animals. The body of the trap is designated by the numeral 2 and may be attached to the bottom 1 in any preferred way. A vertical partition 3 subdivides the body of the trap into two compartments or chambers 4 and 5, the compartment or chamber 4 receiving the animals entering the trap and the compartment or chamber 5 retaining the animals after being entrapped and passing therein from the compartment 4. A plate 6 forms the front of the receiving compartment 4 and is provided with an entrance opening 7 which is adapted to be closed by means of a door 8. An arm 9 projecting from the door 8 is pivoted upon a cross rod 10 at the lower end of a passage 11 at one side of the retaining compartment 5. A guide 12 receives the swinging end of the door 8 and prevents inward displacement thereof and maintains a relatively close fit between said door and the inner side of the plate 6. A guide 13 attached to the inner side of the plate 6 contacts with the arm 9, thereby supplementing the action of the guide 12 in maintaining the door 8 in proper position. A plurality of projections 14 extend inwardly from the door 8 and a detent 15 pivoted at 16 is adapted to engage said projection and hold the door in open position. The detent 15 has an extension 17 which carries a platform 18 and pressure exerted on the platform 18 operates the detent 15 whereby to release the door 8 which automatically closes. A bait box 19 suspended from the rear wall of the compartment 4 receives the bait and the animal in attempting to reach the bait steps upon the platform 18 which is depressed, thereby releasing the door 8 which automatically closes. The entrapped animal, startled by the movement of the platform and the click of the closing door, seeks to escape and springs to the passage 11, which is closed at its entrance by means of a door 20 pivoted at its upper end to the top of the trap and adapted to swing into the compartment 5 at its lower end which normally engages the cross rod 10, whereby its movement into the receiving compartment 4 is prevented. A chute 21 extends into the passage 11 and normally closes the bottom thereof. The front end of the chute 21 projects a short distance into the compartment 4 and a weighted bail 22 is connected thereto and is pivoted upon the cross rod 10. The weighted bail 22 normally operates to hold the rear end of the chute 21 elevated and in contact with a transverse rod 23 which forms a stop whereby to limit the downward movement of the weighted bail and the upward movement of the chute at its rear end. A lateral projection 24 at the outer side of the weighted bail 22 extends across the path of the arm 9 so as to engage the same and open the door 8 when the rear end of the chute 21 is depressed in the passage of the animal from the compartment 4 into the compartment 5, and the instant the animal is precipitated from the chute into the compartment 5, the chute returns to normal position under the weight of the bail 22, the door 8 being held in open position by the detent 15. A rear door 25 closes an opening in the rear end of the trap through which access is had to the retaining compartment 5 for ridding the trap of the animals after the same have been drowned or otherwise disposed of. A catch 26 normally operates to hold the door 25 in closed position. The passage 11 is separated from the compartment 5 by means of a partition, whereby to prevent the entrapped animals contained in the compartment 5 from reaching the upper portion of the passage 11 and the top side of the chute 21 so as to effect an opening of the door 8 and the possible escape of an animal from the compartment 4.

What is claimed is:

1. A trap having a receiving chamber and a captive chamber, said receiving chamber having an entrance opening, a door for said opening, an arm extending from said door, a rod on which said arm is pivoted, a detent adapted to engage said door to maintain it in open position, a victim actuated means to release said detent from engagement with the door, a chute leading from the receiving chamber to the captive chamber, said chute having a weighted bail to maintain it in a normal position, said bail being pivoted on said rod, and said bail being engageable with said arm to open the door as a captive passes through the chute.

2. A trap having a receiving chamber and a captive chamber, said receiving chamber having an entrance opening, a door for said opening, an arm extending from said door, a rod on which said arm is pivoted, a chute leading from the receiving chamber to the captive chamber, said chute having a weighted bail to maintain it in a normal position, said bail being pivoted on said rod, and said bail being engageable with said arm to open the door as a captive passes through the chute, a plate at one side of the receiving chamber through which said opening is provided, said plate having a flange at one end constituting a guide for the door, a projection on said door, and a captive-operable detent in the receiving chamber and coacting with said projection.

In testimony whereof I affix my signature in presence of two witnesses.

WILLIAM FERRELL.

Witnesses:
 WM. BRITTON,
 EARL FRIEND.